United States Patent
Pokharel et al.

(10) Patent No.: US 8,345,368 B2
(45) Date of Patent: Jan. 1, 2013

(54) BIPOLAR POSITION ERROR BURSTS WITH UNIPOLAR SERVO FIELDS

(75) Inventors: Puskal Prasad Pokharel, Edina, MN (US); Barmeshwar Vikramaditya, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 29 days.

(21) Appl. No.: 12/969,305

(22) Filed: Dec. 15, 2010

(65) Prior Publication Data

US 2012/0154949 A1 Jun. 21, 2012

(51) Int. Cl.
*G11B 5/09* (2006.01)

(52) U.S. Cl. ......................................... 360/48

(58) Field of Classification Search .................... 360/48, 360/71, 31
See application file for complete search history.

(56) References Cited

U.S. PATENT DOCUMENTS

| | | | |
|---|---|---|---|
| 4,912,585 A | 3/1990 | Belser et al. | |
| 7,612,961 B2 | 11/2009 | Yamamoto | |
| 2006/0280975 A1 | 12/2006 | Albrecht et al. | |
| 2011/0188149 A1* | 8/2011 | Albrecht et al. | 360/71 |
| 2011/0188152 A1* | 8/2011 | Albrecht et al. | 360/75 |

\* cited by examiner

*Primary Examiner* — Fred Tzeng
(74) *Attorney, Agent, or Firm* — Alan G. Rego; Westman, Champlin & Kelly, P.A.

(57) ABSTRACT

A storage medium has a first servo field having magnetic lands separated by nonmagnetic areas, the magnetic lands of the first servo field having a unipolar pattern. The medium further includes a second servo field having magnetic lands separated by nonmagnetic areas, the magnetic lands of the second servo field having a bipolar pattern.

20 Claims, 10 Drawing Sheets

BIPOLAR POSITION ERROR BURSTS WITH UNIPOLAR SERVO FIELDS

BACKGROUND

Disc drives are used to store information. The information is stored on discs in the drive along concentric tracks that are often divided into data sectors and servo sectors. The data sectors contain the recorded data and the servo sectors contain information that can be used to position a head for reading and writing along the tracks.

Specifically, servo sectors typically include a preamble that allows the disc drive to generate a demodulation signal for demodulating the remainder of the information in the servo sector; a timing mark that allows the disc drive to establish a starting point for phase computations involving the servo read signal; and a gray code field that can be decoded to identify a track identifier (track ID). The servo sector also contains position error signal (PES) bursts that can be used to determine the position of the head within a track.

In general, there are two types of PES bursts: a null-type and a phase-type. When reading a null-type PES burst, the magnitude of the read signal indicates the position of the head within the track. When reading a phase-type PES burst, the phase of the read signal indicates the position of the head within the track.

Some disc drives utilize patterned media. In patterned media, photolithography and other similar techniques are used to create lands or islands of magnetic material that are surrounded by either non-magnetic material or grooves containing no material.

The discussion above is merely provided for general background information and is not intended to be used as an aid in determining the scope of the claimed subject matter.

SUMMARY

A storage medium has a first servo field having magnetic lands separated by nonmagnetic areas, the magnetic lands of the first servo field having a unipolar pattern. The medium further includes a second servo field having magnetic lands separated by nonmagnetic areas, the magnetic lands of the second servo field having a bipolar pattern.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
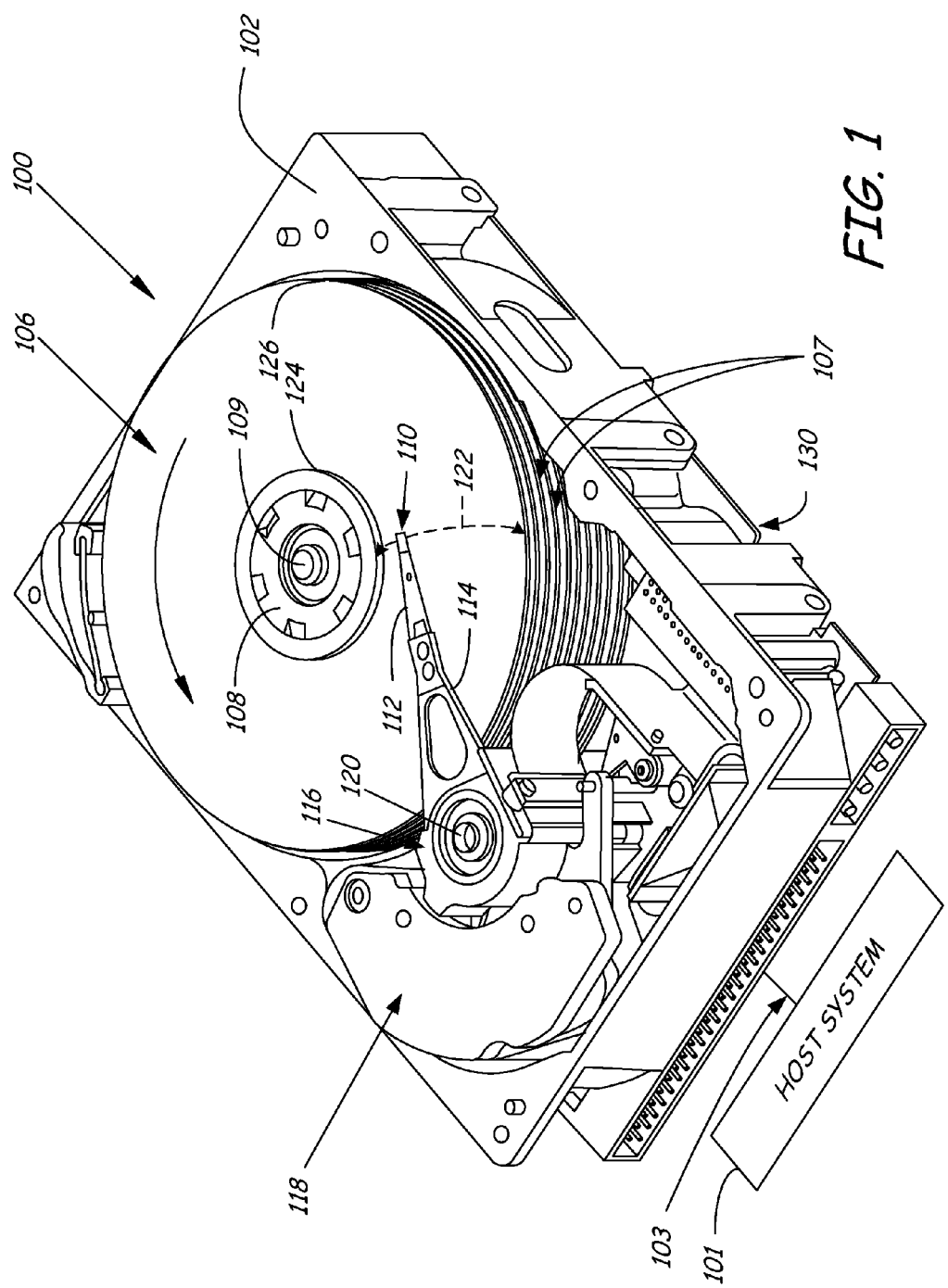
FIG. 1 is an isometric view of a storage device

FIG. 1 is an isometric view of a storage device 100 in which embodiments discussed below may be practiced. Storage device 100 is a disc drive that includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110, which is mounted to disc drive 100 for communication with the disc surface. In the example shown in FIG. 1, sliders 110 are supported by suspensions 112, which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host system 101.

Each disc surface of disc pack 106 represents a data storage medium. Each surface contains radially-spaced concentric tracks that are divided into data sectors and servo sectors. The data sectors contain data that is stored and retrieved from the disc surface. The servo sectors contain stored values that are used to identify the position of the head over the disc.

In disc surfaces that utilize patterned media, a layer of magnetic material is patterned using photolithography or other techniques to produce islands of magnetic material also referred to as lands. These lands are surrounded by either non-magnetic material or empty spaces referred to as grooves.

When patterned media were first used, the servo sectors were written using unipolar patterns in which the magnetic moments of the magnetic material on each of the lands was oriented in the same direction. This made writing the servo sector easy since the write head could be configured to generate a static magnetic field and then could simply be passed over each of the tracks of the servo sector or alternatively, the whole disk could be placed in a properly oriented static magnetic field. During reading of these unipolar servo sectors, the read head detects transitions between areas with no magnetic moment (the grooves) and areas with magnetic moments (the lands).

In later systems, the entire servo sector was written using a bipolar pattern in which alternating lands were given magnetic moments that pointed in opposite directions. Thus, a magnetic moment of a first land would be in an up direction while the magnetic moment of the next land would be in a down direction followed by a land with a magnetic moment in the up direction and so forth. Using a bipolar pattern in the servo sector increases the signal-to-noise ratio by creating a positive electrical signal when the head passes over a land with a magnetic moment in a first direction and a negative electrical signal when the head passes over a land with a magnetic moment in the opposing direction. The difference between the positive and negative magnitudes was twice as large as the magnitude of the signal generated over a unipolar servo sector pattern.

However, writing a bipolar pattern in a servo sector is time-consuming. In particular, the track identification field must be written one track at a time when using a bipolar pattern in order to ensure that the magnetic moments of successive lands along a track alternate directions. As a result, a bipolar pattern that is written over an entire servo sector can at most be written at a rate of one track per pass of the write head. In addition, hardware used to decode the track identification field must be able to decode both the initial unipolar pattern and the later bipolar pattern if a unipolar track identification field is converted to a bipolar track identification field.

Under embodiments described herein, servo sectors are provided with unipolar patterns in some fields and bipolar patterns in other fields.

Figure 2:
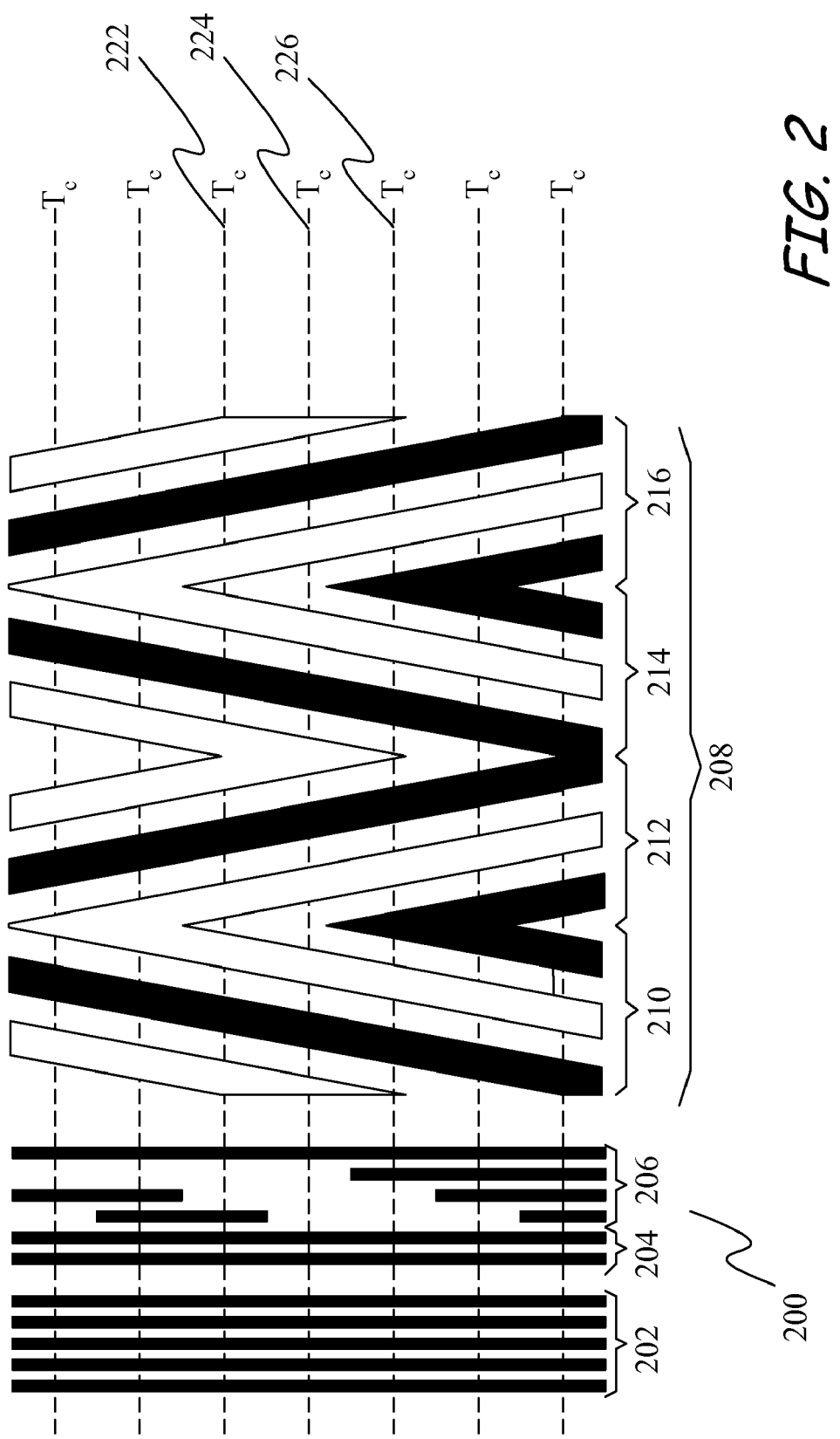
FIG. 2 is a top view of a servo sector with a phase-type position error signal field.

FIG. 2 provides an example of a phase-type servo sector under one such embodiment.

In FIG. 2, a servo sector 200 is shown that spans a plurality of concentric tracks each having a track center $T_c$. Servo sector 200 consists of preamble field 202, timing mark 204, gray coded track identifier (track ID) 206, and position error signal field 208. Position error signal field 208 consists of A-field 210, B-field 212, C-field 214, and D-field 216. Position error signal field 208 is a phase-type position error signal field with magnetic moment lands that extend at acute angles to the track center lines such as track center lines 222, 224, and 226.

In FIG. 2, lands shaded in black have a magnetic moment that is oriented in a first direction and lands with white shading have a magnetic moment that is oriented in a second direction that is opposite the first direction. For example, in some embodiments, the black shaded areas have a magnetic moment pointing out of the page and the white shaded areas have a magnetic moment pointing into the page.

As shown in FIG. 2, servo sector 200 utilizes a unipolar pattern for preamble 202, timing mark 204, and track ID field 206, with each land in those fields having a magnetic moment in the same direction. The position error signal field 208, however, has a bipolar pattern in which the magnetic moments of successive lands have opposing directions.

Figure 3:
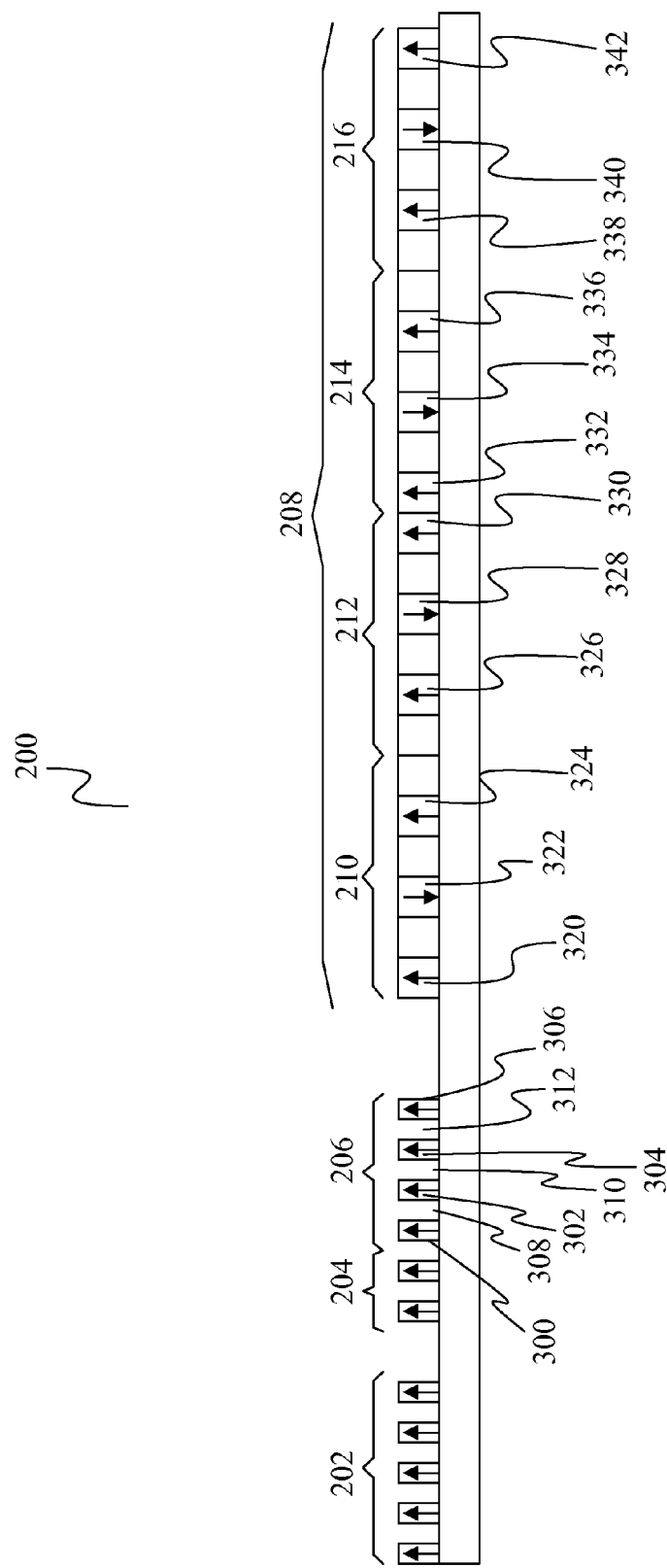
FIG. 3 is a side view of the servo sector of FIG. 2.

The directions of the magnetic moments of the lands is shown more clearly in the side view of servo sector 200 shown in FIG. 3. In FIG. 3, track ID field 206 is shown to have lands 300, 302, 304, and 306 separated by grooves 308, 310, and 312. Lands 300, 302, 304, and 306 are shown to have a magnetic moment oriented in a first direction pointing out of the magnetic medium as indicated by the arrows in FIG. 3. Position error signal field 208 is shown to include lands 320, 322, 324, 326, 328, 330, 332, 334, 336, 338, 340 and 342 that are separated by grooves. As shown in FIG. 3, lands 320, 322, and 324, which make up A-field 210, have magnetic moment orientations that alternate such that the magnetic moment of land 320 is up, the magnetic moment of land 322 is down, and the magnetic moment of land 324 is up. Similarly, lands 326, 328 and 330 of B-field 212 have magnetic moment directions that alternate; lands 332, 334, and 336 of C-field 214 have magnetic moment directions that alternate; and lands 338, 340 and 342 of D-field 216 have magnetic moment directions that alternate.

Figure 4:
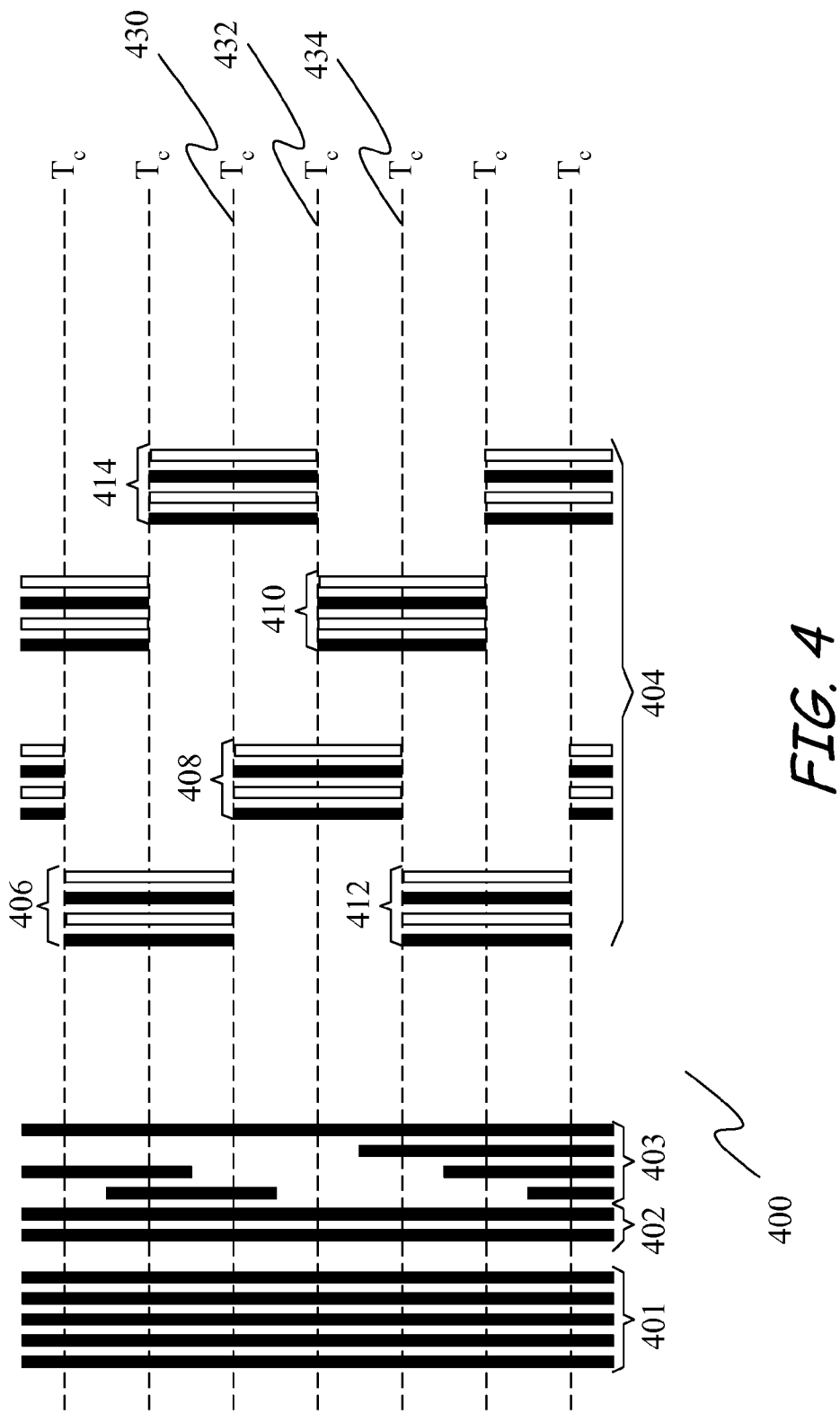
FIG. 4 is a top view of a servo sector with a quadrature null-type position error signal field.

FIG. 4 provides a top view of a servo sector 400 providing another embodiment in which one field in the servo sector is written with a unipolar pattern while another field is written in a bipolar pattern.

Servo sector 400 consists of preamble 401, timing mark 402, gray coded track identifier field 403, and position error signal field 404. In FIG. 4, lands with magnetic moments in a first direction are shaded in black and lands with a magnetic moment in a second opposing direction are shaded in white. Position error signal field 404 is a null-type quadrature position error signal field in which position error signal burst such as bursts 406, 408, 410, 412, and 414 comprise radially extending lands that are perpendicular to the track center line such as track center lines 430, 432 and 434.

Figure 5:
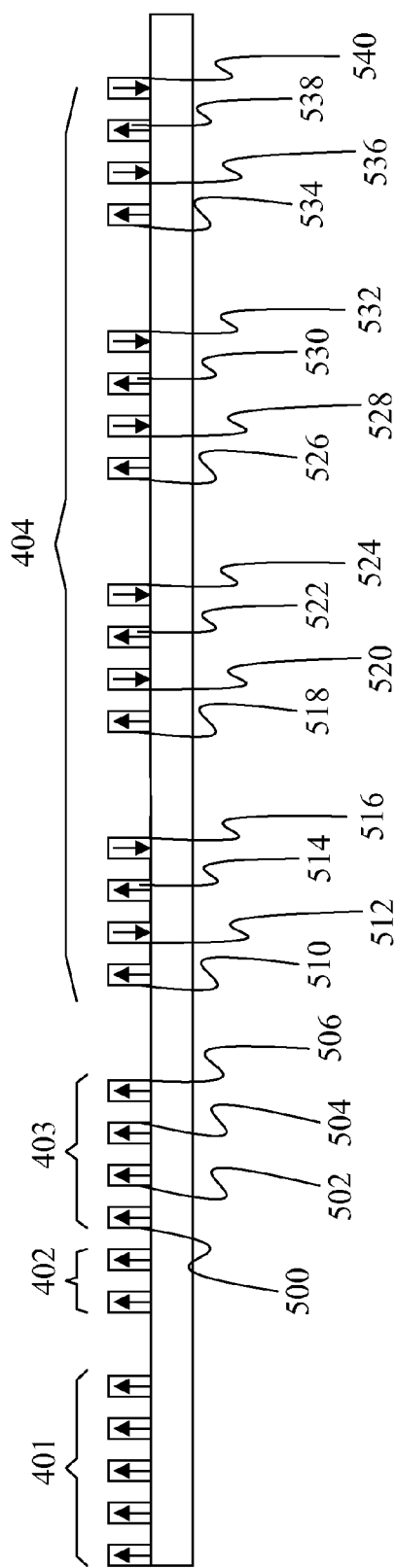
FIG. 5 is a side view of the servo sector of FIG. 4.

FIG. 5 shows a side view of servo sector 400 showing the orientation of the magnetic moments for the lands. As shown by the arrows in FIG. 5, the lands in preamble 401, timing mark 402, and track ID field 403 contain magnetic moments that all point in the same direction. Specifically, lands 500, 502, 504, and 506 of track ID field 403 all have magnetic moments that point away from the surface of the disc. However, within position error signal field 404, the lands are written with a bipolar pattern such that successive lands have oppositely directed magnetic moments. For example, lands 510, 514, 518, 522, 526, 530, 534, and 538 have magnetic moments pointing in an up direction while lands 512, 516, 520, 524, 528, 532, 536, and 540 have magnetic moments pointing in a down direction.

Figure 6:
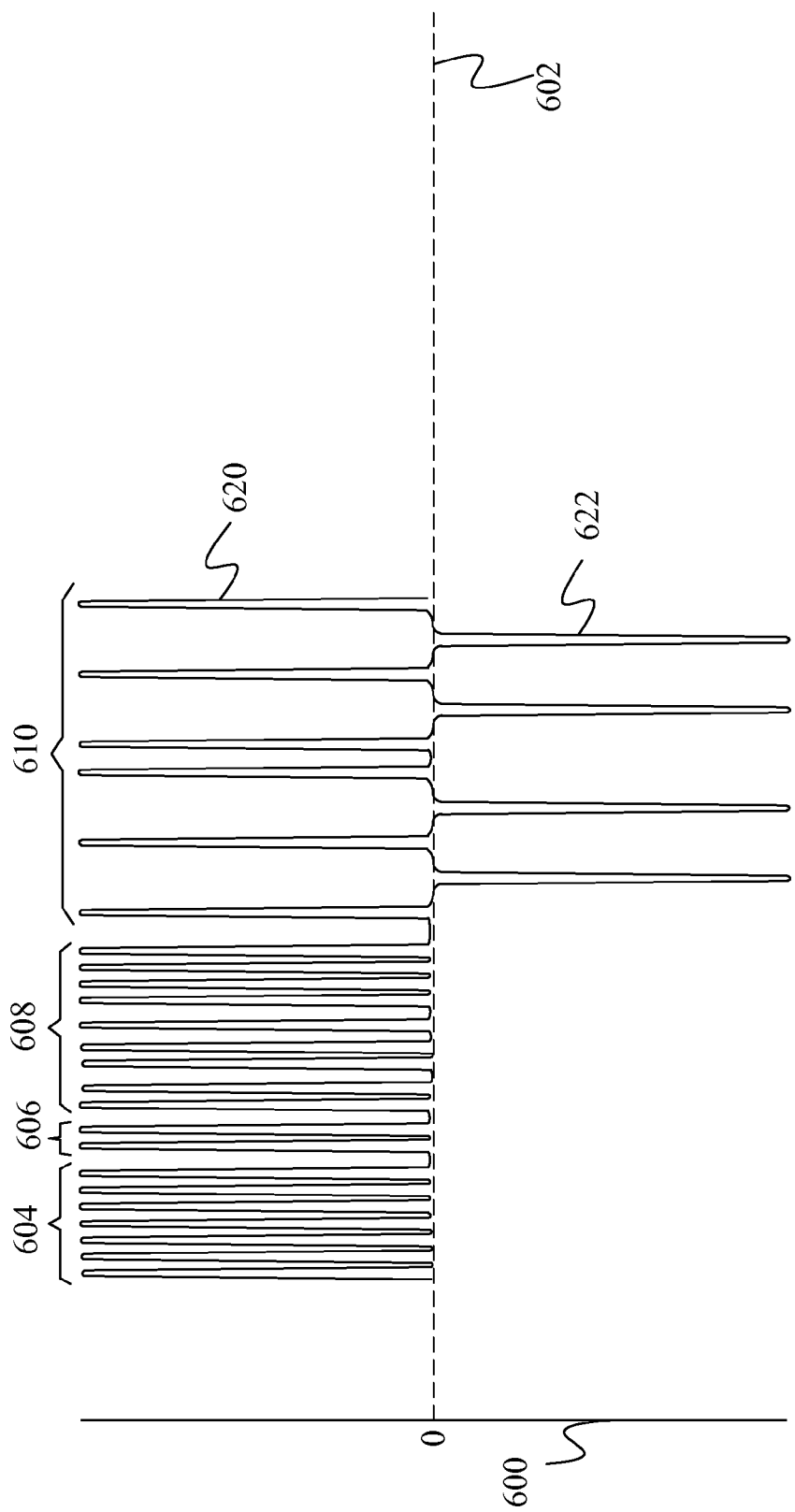
FIG. 6 is a graph of a read back signal generated from the servo sector of FIG. 2.

FIG. 6 provides a read signal generated by a read head passing over servo sector 200 of FIG. 2. In FIG. 6, the amplitude of the read back signal is shown on vertical axis 600 and time is shown along horizontal axis 602.

Section 604 of the read back signal is produced by preamble 202, section 606 is produced by timing mark 204, section 608 is produced by track ID field 206 and section 610 is produced by position error signal field 208.

Because preamble 202, timing mark 204, and track ID field 206 are written with a unipolar pattern, each of the pulses in the read back signal are positive. Because position error signal field 208 is written with a bipolar pattern, the pulses of the read back signal alternate from being positive to being negative. For instance, the read back signal includes positive pulse 620 and negative pulse 622 where positive pulse 620 is from a magnetic moment in a first direction and negative pulse 622 is from a magnetic moment in the opposite direction. Having both positive and negative pulses within the position error signal provides a higher signal-to-noise ratio than in the signal generated from fields that use a unipolar pattern such as fields 202, 204, and 206. This higher signal-to-noise ratio allows for more accurate positioning information when the read back signal is corrupted by noise.

Figure 7:
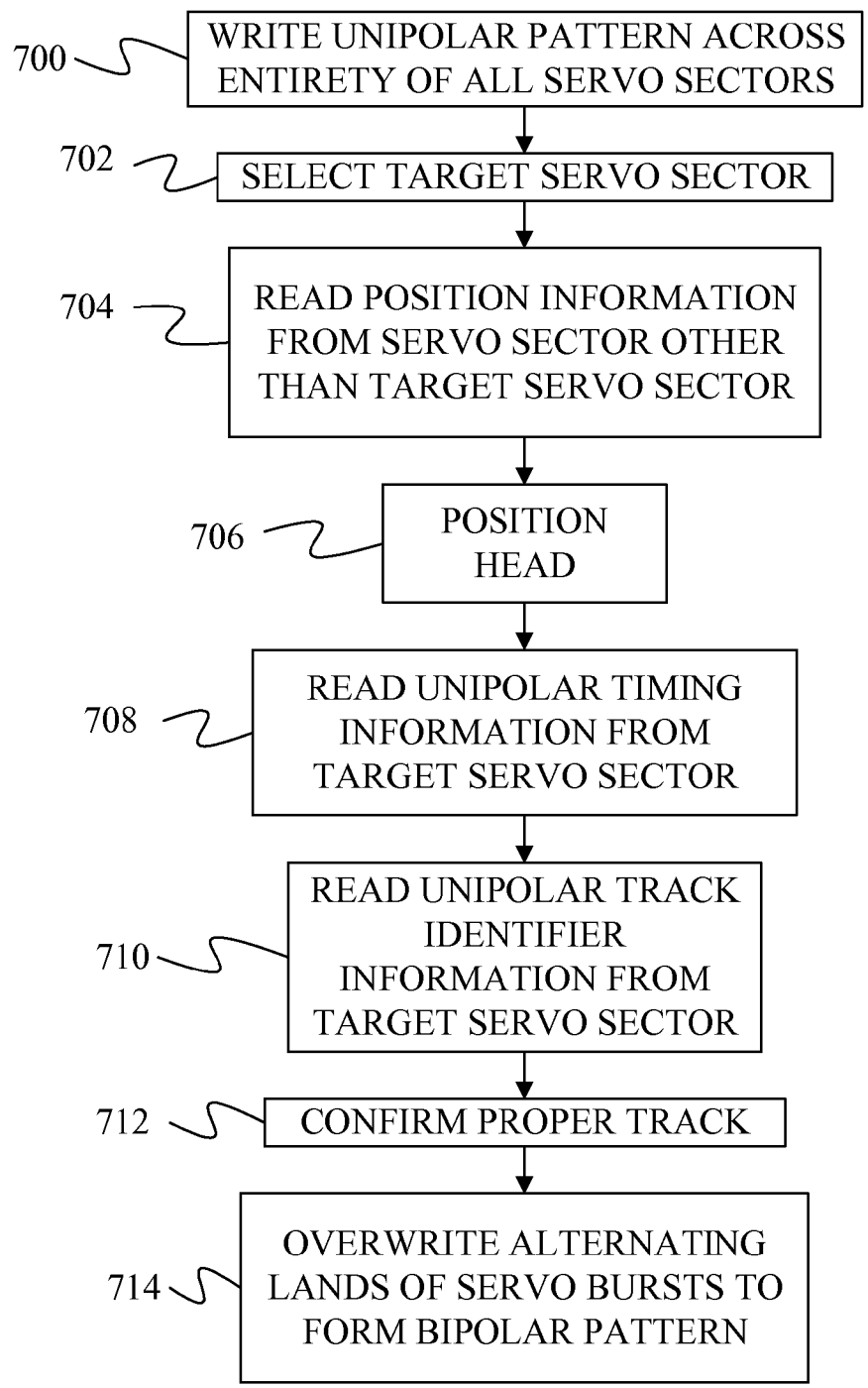
FIG. 7 is a flow diagram of a method of writing a servo sector with a unipolar pattern for some fields and a bipolar pattern for a position error signal field.

FIG. 7 shows a flow diagram of a method of writing a servo sector with a unipolar pattern for some fields and a bipolar pattern for a position error signal field. In step 700, a unipolar pattern is written across the entirety of all servo sectors on the disc surface. This unipolar pattern is formed by generating a static magnetic field with the write head as it crosses over a servo sector for all radial positions along the servo sector or by placing the entire disk in a static magnetic field. At step 702, a target servo sector is selected and at step 704, position information from a servo sector other than the target servo sector is read. This position information includes a track identifier as read from a gray coded track ID field and position information generated from a position error signal field. Under some embodiments, this position information may be taken from a different track than a desired track for the target servo sector. At step 706, the position information is used to position the head radially along the disc surface. Under some embodiments, this may included changing which track the head is over. At step 708, unipolar timing information is developed from the target servo sector. This unipolar timing information is read from a preamble and timing mark written with a unipolar pattern in the target servo sector. At step 710, track identifier information is read from the unipolar patterned track ID field. At step 712, the track identifier information is used to confirm that the head is still positioned on the proper track. At step 714, alternating lands of the servo bursts are overwritten to produce a magnetic moment in an opposite direction from the direction of the magnetic moment in the unipolar pattern. This forms a bipolar pattern in the position error signal bursts.

Figure 8:
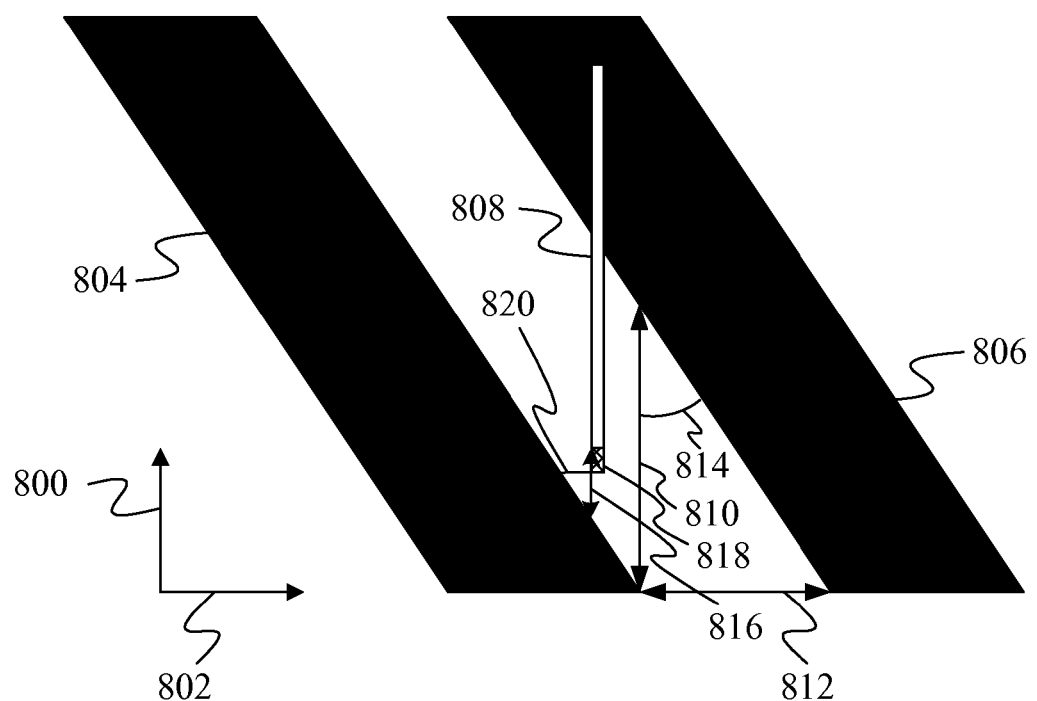
FIG. 8 is an enlarged view of a position error signal field.

Timing for overwriting alternating lands within the position error signal field relies on the known geometry of the field and the timing the information read from the target servo sector. In order to ensure that only the desired lands are overwritten, and to maximize the efficiency of the writing process, several parameters are taken into consideration. FIG. 8 shows these parameters in an expanded view of two lands found in the position error signal field of FIG. 2 of a discrete track recording medium in which tracks of magnetic material are separated by concentric grooves.

In FIG. 8, the vertical direction 800 represents the cross track direction and the horizontal direction 802 indicates the down track direction. FIG. 8 shows two lands 804 and 806 and a write element 808. Write element 808 is larger than a radial groove size 810, which measures the distance between lands in the radial direction 800. The separation between the lands is also described by a down track groove size 812 that is measured in the down track direction 802. The lands are at an angle 814 to radial direction 800.

To ensure that the write element does not change the magnetic moment of a portion of land 804 when attempting to change the magnetic moment direction of land 806, a design margin 816 is defined representing the distance that write element 808 should be radially displaced from land 804 before writing commences. Design margin 816 is selected to be larger than any possible cross track errors or variations, shown as cross track error 818 in FIG. 8. A margin for timing error 820 representing the down track distance between the write element and land 804 can be determined as a fraction of the pattern period 2d as:

$$\delta = \frac{(\varepsilon - c)\tan\theta}{2d} = \frac{\varepsilon - c}{2r} \quad \text{Equation 1}$$

where δ is the margin for timing error, d is down track lands separation distance 812, ϵ is the design margin error 816, c is the radial track variation of the writer, θ is angle 814 between the radial direction and the lands, and r is the radial groove size 810.

For writing, if there is a cross-track overlap p of the write head between passes, at least r−(ϵ+c)−p of a track will be covered with each pass. Note that in this computation, the worst case radial track variation has occurred in the opposite direction from that shown in FIG. 8. Using this value, the number of passes per track can be computed as:

$$\frac{t}{r - (\varepsilon + c) - p} \quad \text{Equation 2}$$

where t is the radial track width.

Under one embodiment, t=72.6 nanometers, r=2t, ϵ=0.5t, c=0.16t, and p=0.2t. Using these values, the passes per track can be computed as 0.88 or inversely, the number of tracks written per pass can be computed as 1.136. Thus, more than a single track width can be overwritten per pass when forming the bipolar pattern. This is an improvement over the prior art where each pass could at most overwrite a single track.

Figure 9:
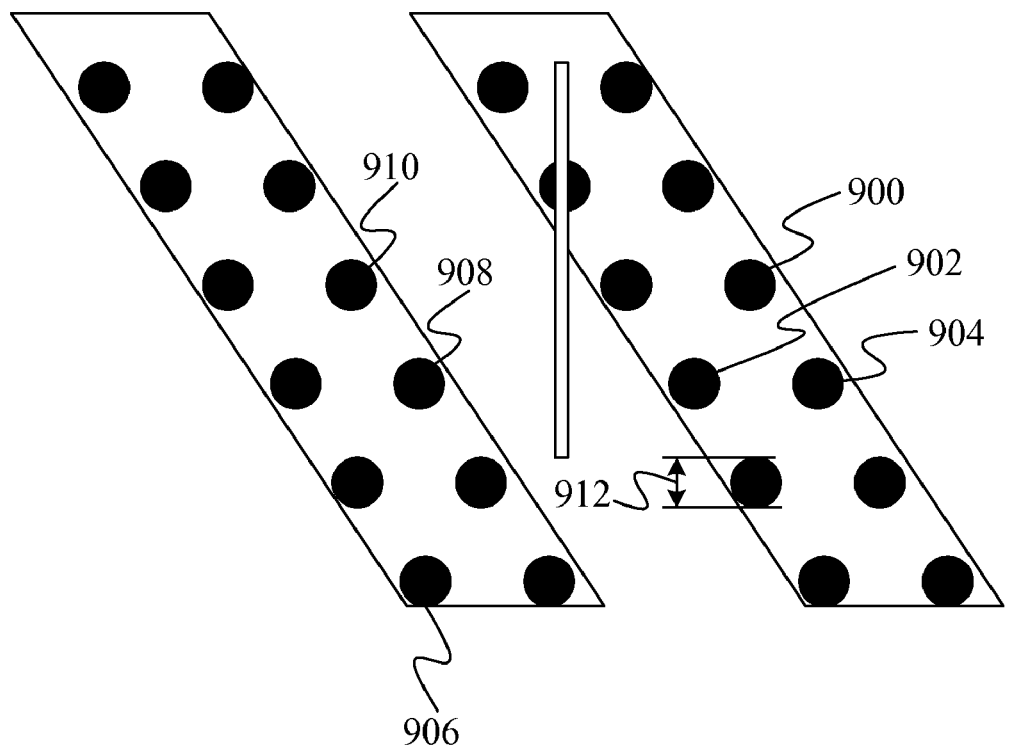
FIG. 9 is an enlarged view of a position error signal field for a bit patterned media.

FIG. 9 shows an expanded version of two lands of the position error signal field of FIG. 2 for a bit patterned media. In FIG. 9, the magnetic material is limited to circular bits within the land perimeter such as bits 900, 902, 904, 906, 908 and 910. In such embodiments, a likely choice for the design margin ϵ would be the diameter 912 of a dot since that would ensure each dot to be initialized is fully under the writer. Using a dot diameter of 0.25t, this would result in a passes per track rate of 0.72 or tracks per pass rate of 1.38.

Figure 10:
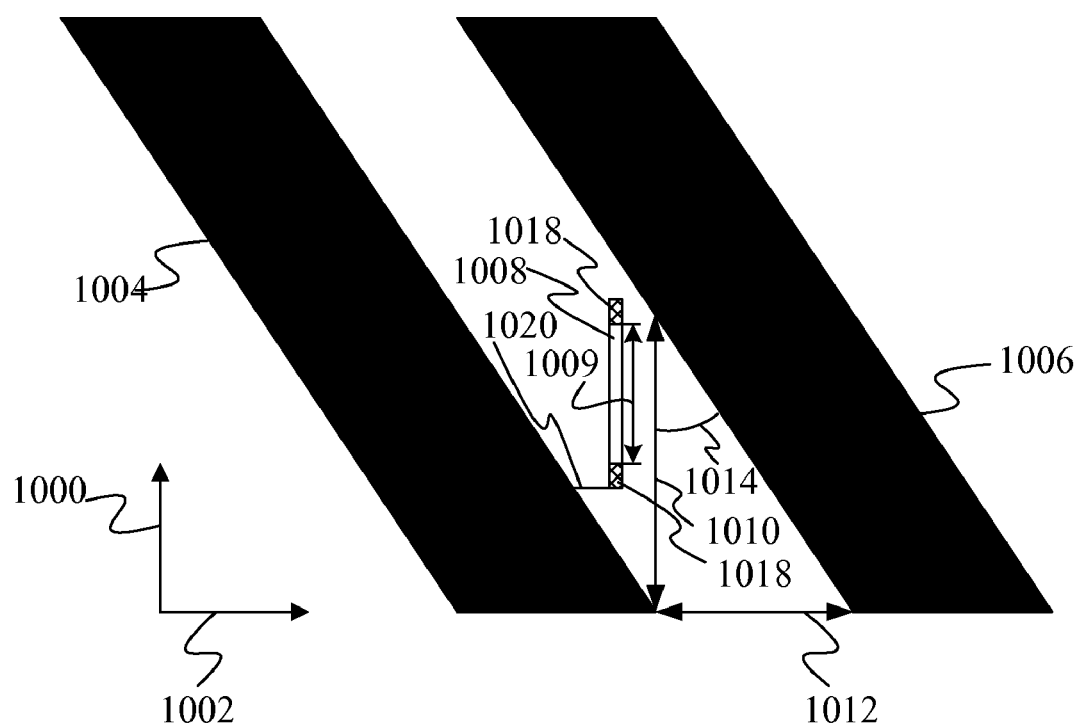
FIG. 10 is an enlarged view of a position error signal field with a smaller-width write element.

Some embodiments described above may also be implemented using a smaller write head such as a write head found within a storage device. FIG. 10 shows an expanded view of two lands found in the position error signal field of FIG. 2 of a discrete track recording medium with a smaller write head.

In FIG. 10, the vertical direction 1000 represents the cross track direction and the horizontal direction 1002 indicates the down track direction. FIG. 10 shows two lands 1004 and 1006 and a write element 1008. Write element 1008 has a width 1009 that is smaller than a radial groove size 1010, which measures the distance between lands in the radial direction 1000. The separation between the lands is also described by a down track groove size 1012 that is measured in the down track direction 1002. The lands are at an angle 1014 to radial direction 1000. Possible cross track errors or variations are shown as cross track errors 1018.

To ensure that write element 1008 does not change the magnetic moment of a portion of land 1004 and to ensure that the field of write element 1008 has transitioned before reaching land 1006, the transition in the magnetic field of write element 1008 is designed to occur when the trailing edge of write element 1008 is an equal distance from land 1004 and land 1006 as measured in the down track direction. Using this goal, a margin for timing error 1020 representing the down track distance between the trailing edge of write element 1008 and land 1004 can be determined as a fraction of the pattern period 2d as:

$$\delta = \frac{.5(r - (w + 2c))\tan\theta}{2d} = \frac{r - (w + 2c)}{4r} \quad \text{Equation 3}$$

where δ is the margin for timing error, d is down track lands separation distance 1012, c is the radial track variation 1018 of the writer, w is the width 1009 of write element 1008, θ is angle 1014 between the radial direction and the lands, and r is the radial groove size 1010.

For writing, if there is a cross-track overlap p of the write element between passes, at least w−p of a track will be covered with each pass. Using this value, the number of passes per track can be computed as:

$$\frac{t}{w - p} \quad \text{Equation 4}$$

where t is the radial track width.

Under one embodiment, t=72.6 nanometers, r=2t, w=0.8t, c=0.16t, and p=0.35t. Using these values, the passes per track can be computed as 2.22 and the margin of timing error is 0.105 or 10.5% of the pattern period.

The illustrations of the embodiments described herein are intended to provide a general understanding of the structure of the various embodiments. The illustrations are not intended to serve as a complete description of all of the elements and features of apparatuses and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above sections and/or arrangement of paragraphs are provided for ease of reading only and, for example, do not limit one or more aspects of the disclosure discussed in a particular section with respect to a particular example and/or embodiment from being combined with, applied to, and/or utilized in another particular example, and/or embodiment which is described in another section. Elements, features and other aspects of one or more examples may be combined and/or interchangeable with elements, features and other aspects of one or more other examples described herein.

What is claimed is:

1. A storage medium comprising:
   a first servo field having magnetic lands separated by nonmagnetic areas, the magnetic lands of the first servo field having a unipolar pattern; and
   a second servo field having magnetic lands separated by nonmagnetic areas, the magnetic lands of the second servo field having a bipolar pattern.

2. The storage medium of claim 1 wherein the second servo field comprises a servo position error field.

3. The storage medium of claim 2 wherein the servo position error field comprises a null-type field.

4. The storage medium of claim 2 wherein the servo position error field comprises a phase-type servo field.

5. The storage medium of claim 1 wherein the servo position error field spans more than one track.

6. The storage medium of claim 5 wherein the first servo field comprises a servo field that identifies a track on the storage medium.

7. A storage device having a storage medium comprising:
   a track identifier field having magnetic lands separated by nonmagnetic grooves, the magnetic lands having a unipolar pattern for each track of a plurality of tracks; and
   a position error signal burst having magnetic lands separated by nonmagnetic grooves, the magnetic lands of the burst having a bipolar pattern.

8. The storage device of claim 7 further comprising multiple position error signal bursts per track, the magnetic lands of each burst having a bipolar pattern.

9. The storage device of claim 7 wherein the storage medium comprises a discrete track recording medium.

10. The storage device of claim 7 wherein the storage medium comprises a bit patterned medium.

11. The storage device of claim 7 wherein the position error signal burst is a phase-type position error signal burst.

12. The storage device of claim 7 wherein the position error signal burst is a null-type position error signal burst.

13. A method comprising:
   writing a unipolar pattern in multiple fields of a servo sector on a storage medium; and
   overwriting at least a portion of the unipolar pattern of at least one field of the servo sector to form a bipolar pattern such that during overwriting, a single pass of the head overwrites more than a track width of the field.

14. The method of claim 13 wherein overwriting at least one field comprises overwriting a servo burst field.

15. The method of claim 13 wherein after overwriting is complete a field containing track identification information continues to have a unipolar pattern.

16. The method of claim 13 wherein overwriting at least one field comprises determining a position for a write head over the servo sector based on position information determined from a different servo sector on the storage medium.

17. The method of claim 16 further comprising reading a field with a unipolar pattern within the servo sector to confirm a track identification before overwriting the at least one field.

18. The method of claim 17 further comprising reading a field with a unipolar pattern within the servo sector to develop timing information used to overwrite the at least one field.

19. The method of claim 13 wherein overwriting at least one field comprises determining a position for a write head over a first track in the servo sector based on position information determined from a second track.

20. The method of claim 13 wherein writing a unipolar pattern in multiple fields of a servo sector comprises writing a unipolar pattern over all fields of the servo sector.

* * * * *